United States Patent
Markow et al.

(10) Patent No.: US 10,795,605 B2
(45) Date of Patent: Oct. 6, 2020

(54) STORAGE DEVICE BUFFER IN SYSTEM MEMORY SPACE

(71) Applicant: Dell Products L.P., Round Rock, TX (US)

(72) Inventors: Mitchell A. Markow, Hutto, TX (US); Lee Zaretsky, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/959,055

(22) Filed: Apr. 20, 2018

(65) Prior Publication Data

US 2019/0324681 A1 Oct. 24, 2019

(51) Int. Cl.
*G06F 3/06* (2006.01)
*G06F 13/16* (2006.01)
*G06F 12/02* (2006.01)

(52) U.S. Cl.
CPC .......... *G06F 3/0656* (2013.01); *G06F 3/0611* (2013.01); *G06F 3/0685* (2013.01); *G06F 12/0238* (2013.01); *G06F 13/1673* (2013.01); *G06F 2212/205* (2013.01); *G06F 2212/25* (2013.01)

(58) Field of Classification Search
CPC .... G06F 3/0656; G06F 3/0611; G06F 3/0613; G06F 12/0238; G06F 2212/2024; G06F 2212/205; G06F 2212/25; G06F 2212/1024; G06F 2003/0691
See application file for complete search history.

(56) References Cited

U.S. PATENT DOCUMENTS

| | | | | |
|---|---|---|---|---|
| 7,610,445 B1 * | 10/2009 | Manus | ................ | G06F 12/0804 711/104 |
| 8,671,241 B2 * | 3/2014 | Molloy | ............... | G06F 12/0246 711/103 |
| 9,829,951 B2 * | 11/2017 | Kumar | .................. | G06F 1/3275 |
| 2008/0065845 A1 * | 3/2008 | Montero | ............... | G06F 1/3225 711/162 |
| 2008/0082752 A1 * | 4/2008 | Chary | ....................... | G06F 1/32 711/118 |
| 2008/0140945 A1 * | 6/2008 | Salessi | .................... | G06F 3/061 711/148 |
| 2009/0313416 A1 * | 12/2009 | Nation | ................ | G06F 12/0638 711/100 |
| 2014/0189198 A1 * | 7/2014 | Siddiqi | ............... | G06F 12/0246 711/103 |
| 2018/0225059 A1 * | 8/2018 | Haas Costa | ............. | G06F 13/16 |

* cited by examiner

*Primary Examiner* — Tracy A Warren
(74) *Attorney, Agent, or Firm* — Norton Rose Fulbright US LLP (57) ABSTRACT

An information handling system may include a resistive memory buffer to supplement a system main memory unit of the information handling system. A processor of the information handling system may map the resistive memory buffer as system memory, along with the system main memory unit. The processor may use the system memory, including the resistive memory buffer and the system main memory unit in executing one or more applications. The resistive memory buffer may improve performance of the information handling system, such as during hibernation and wake-up processes and memory flush processes.

19 Claims, 6 Drawing Sheets

STORAGE DEVICE BUFFER IN SYSTEM MEMORY SPACE

FIELD OF THE DISCLOSURE

The instant disclosure relates to memory in information handling systems. More specifically, portions of this disclosure relate to a resistive memory buffer in an information handling system.

BACKGROUND

As the value and use of information increase, individuals and businesses seek additional ways to process and store information. One option available for such a purpose is the information handling system. An information handling system generally processes, compiles, stores, and/or communicates information or data for business, personal, or other purposes thereby allowing users to take advantage of the value of the information. Because technology and information handling requirements vary between different users or applications, information handling systems may also vary regarding what information is handled, how the information is handled, how much information is processed, stored, or communicated, and how quickly and efficiently the information may be processed, stored, or communicated. Variations in information handling system build and capabilities allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems are equipped with data storage components, such as hard disks, flash memory, solid state drives, memory buffers, and other information storage components to store information temporarily or over a long period of time. As user demands with respect to speed of accessing and storing information have increased, solid state drives, such as those composed of NAND flash memory, have increased in popularity due, in part, to their speed, low power consumption, and cost.

Instead of reading and writing directly to a long-term storage component, such as a hard disk or NAND flash memory, which can introduce significant latency due to the nature of the storage components and their distance from a processor of the system, information handling systems may include one or more buffers of system memory, often located near a processor, to enhance the speed of the system in accessing, adjusting, and storing information. Buffers are often comprised of memory having a quick response time, such as dynamic random-access memory (DRAM).

However, buffer size is often limited due to space constraints near the processor, and the cost of high-speed memory, increasing the frequency with which information handling systems must copy and refresh buffer contents and thereby increasing system latency. Latency can negatively impact a user experience by causing an information handling system to react more slowly to user requests. Further, buffers are frequently comprised of volatile memory, meaning that if an information handling system loses power, the information stored in a buffer may be lost. If a system is shut down by a user, the contents of a buffer must be copied, thereby increasing a delay between a user instruction to shut down and system shut down.

Shortcomings mentioned here are only representative and are included simply to highlight that a need exists for improved information handling systems, particularly for improved memory buffers in information handling systems. Embodiments described herein address certain shortcomings but not necessarily each and every one described here or known in the art. Furthermore, embodiments described herein may present other benefits than, and be used in other applications than, those of the shortcomings described above.

SUMMARY

An information handling system may include a buffer as part of a storage device, a buffer that is accessible to the processor through the controller for the storage device and used as part of a system memory address space used by the processor in executing applications. In one example, the buffer may be a resistive memory buffer to supplement a system main memory unit of the information handling system. For example, a magneto-resistive random-access memory (MRAM) buffer unit, a nano random-access memory (NRAM) buffer unit, a phase change memory buffer unit, a graphene neuromorphic (long range) memory buffer unit, or other buffer units may be included within a storage device, such as a solid state drive, and mapped, along with a system main memory unit, such as a DRAM buffer located in close proximity to a processor of the information handling system, for use as system memory. The resistive memory buffer, when mapped into a system memory address space of the information handling system by the processor, that is, when mapped as system memory, may increase the amount of system memory available to the information handling system in executing one or more applications, may provide enhanced transfer capabilities between system memory and one or more storage units of the information handling system, and/or may enhance system shut down and start up times. In some embodiments, a Neuromorphic-type buffer unit may provide for acceleration of machine learning workloads as data is moved in and out of the memory and storage systems.

The inclusion of a resistive memory buffer in an information handling system may enhance a user experience in a variety of ways. The short distance between the resistive memory buffer and the storage unit of the information handling system may reduce the time it takes to flush data from the resistive memory buffer to the storage unit, thereby increasing responsiveness of the information handling system. A non-volatile resistive memory buffer may retain stored information even through a shut down or sleep cycle, or even an unexpected power loss, thereby reducing the amount of time necessary for a computer to shut down, sleep, start up, and wake and preventing information loss. Further, a resistive memory buffer may provide additional system memory for use in executing one or more applications, thereby providing a user with enhanced computing capabilities.

An information handling system capable of providing users with an enhanced experience may include a processor, a system main memory unit, and a storage device. The system main memory unit may include DRAM and may be located near the processor to reduce latency. The storage device may include a resistive memory buffer and a storage unit, such as a NAND flash storage array, coupled to the resistive memory buffer. The processor may be capable of mapping both the resistive memory buffer and the system main memory unit into a system memory address space, providing the system with enhanced capabilities. That is, the processor may be capable of mapping both the resistive memory buffer and the system main memory unit as system memory.

The resistive memory buffer may be non-volatile. For example, the resistive memory may include MRAM or a carbon nanotube-based memory, such as NRAM. A non-volatile resistive memory buffer may allow the system to maintain information stored thereon, even when the system is powered down or enters a sleep or hibernate mode. For example, when a user directs an information handling system to enter a hibernate mode in which power is cut off from the resistive memory buffer, the resistive memory buffer may maintain the information stored thereon. Volatile memory, such as DRAM, loses all stored information in the event of power loss, unless the stored information is transferred to non-volatile memory component.

The storage device may also include a controller, such as a system on a chip (SOC) controller for controlling information transfer within the storage device and between the storage device and the processor. In some embodiments, the processor may communicate with and transfer data to and from the resistive memory unit independent of the controller. An interface module may be coupled between the processor and the resistive memory buffer and storage unit and may facilitate communication between the processor and the storage device.

The processor may be configured to address the resistive memory buffer and the system main memory unit as a linear memory space. Thus, the resistive memory buffer may provide an information handling system with a greater amount of system memory for use in executing one or more applications than if the system simply possessed a system main memory unit, such as a DRAM buffer located near a processor of the system.

Alternatively, or additionally, the processor may map the resistive memory buffer to a segment of the system main memory unit, so that information stored in the resistive memory buffer may mirror information stored in the segment of the system main memory unit. Thus, when the processor performs an operation and adjusts information stored in the segment of the system main memory unit, it may make the same adjustment to information stored in the resistive memory buffer. Such mirroring can allow for reduced latency when the processor requests information not currently stored in the resistive memory buffer. Given its close proximity to the storage unit, the resistive memory buffer may transfer the stored information to the storage unit in less time than it would take the system main memory unit to transfer the contents of the mirrored segment to the storage unit. The segment of the system main memory unit is then erased, and the information requested by the processor may be loaded to the resistive memory buffer and the segment of the system main memory unit.

In order to take advantage of a resistive memory buffer, a processor of an information handling system including the resistive memory buffer may begin by mapping a system main memory unit of the information handling system as system memory. The processor may also map the resistive memory buffer as system memory. After mapping both the system main memory unit and the resistive memory buffer as system memory, the system main memory unit and the resistive memory buffer may be used as a single system memory for executing one or more applications.

The resistive memory buffer may be mapped to a segment of the system main memory unit to mirror the information stored on the segment of the system main memory unit. Such mapping can reduce latency. In some instances, it may be necessary for the system memory to flush some or all of its contents, for example, to load different information from a storage unit. The processor may detect a flush condition for the segment of the system main memory to which the resistive memory buffer is mapped. The processor may then copy the information stored on the resistive memory buffer to the storage unit of the storage device. The time required to copy the information stored in the resistive memory buffer may be substantially less than the time required to copy the information from the segment of the system main memory unit due to the close proximity of the resistive memory buffer to the storage unit. The processor may then erase the segment of the system main memory unit without copying the information stored in the segment to the storage unit of the storage device. Thus, latency in flushing system memory may be substantially reduced, improving system responsiveness and a user experience. The information stored in the resistive memory buffer may also be erased, after it is copied. Then, information may be loaded from another portion of the storage unit of the storage device to both the segment of the system main memory unit and the resistive memory buffer.

The resistive memory buffer may provide for reduced system sleep and wake times when entering and exiting a hibernate state. For example, the information handling system, including the processor and the storage device, may enter a hibernate state. When entering a hibernate state, power to the system main memory unit may be cut off. If the system main memory unit is a volatile memory unit, it may be necessary to flush the information stored on the system main memory unit to a storage unit of the storage device so that the stored information is not lost. Transferring the information stored on the system main memory unit to the storage unit of the storage device may increase the amount of time necessary to enter the hibernate state. Information stored on the resistive memory buffer, however, may be maintained even when power is cut off, and thus need not be copied or flushed to the storage unit of the storage device. Thus, the resistive memory buffer may reduce the amount of time necessary to enter the hibernate state. While the information handling system is in the hibernate state, the resistive memory buffer may maintain the information stored thereon. The information handling system may then detect a wake condition, and use the information stored on the resistive memory buffer to perform a rapid wake from the hibernate state. For example, while information may need to be copied from the storage unit to the system main memory unit while the system is exiting the hibernate state, the information required by the resistive memory buffer may already be present, having been maintained through the hibernate state. Thus, the resistive memory buffer may also be used to reduce the time required to exit the hibernate state, thereby enhancing a user experience. A similar process may be applied when the information handling system is powering down and powering up.

An information handling system may include a host system and a storage device housing multiple storage units, along with at least one resistive memory buffer, which may include MRAM and/or NRAM. For example, the storage device may be an enterprise storage enclosure housing multiple solid state drives. The host system may be configured to map the resistive memory buffer as a system memory of the host system. Within the storage device, a storage switching array may be coupled between the resistive memory buffer and the plurality of storage units and may be configured to selectively couple the resistive memory buffer to one or more of the plurality of storage units. The storage switching array may also be configured to selectively couple one or more of the storage units to the host system.

The host system may include a host system main memory unit and may be configured to map both the host system main memory unit and the resistive memory buffer as system memory. When both the resistive memory buffer and the host system main memory unit are mapped as system memory, the host system may be able to utilize a greater amount of system memory when executing one or more applications than when the host system main memory unit is mapped as the system memory alone. Alternatively or additionally, the host system may map the resistive memory buffer to a segment of the host system main memory unit, to mirror the information stored in the segment of the host system main memory unit.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, a two-in-one laptop/tablet computer, mobile device (e.g., personal digital assistant (PDA), smart phone, tablet computer, or smart watch), server (e.g., blade server or rack server), a network storage device, a data center, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more virtual or physical buses operable to transmit communications between the various hardware and/or software components.

In order to provide an enhanced user experience, an information handling system may include a resistive memory buffer. The resistive memory buffer may be housed in a storage device, such as a solid state drive or an enterprise storage enclosure, which may include multiple storage units. The resistive memory buffer may be mapped as system memory to increase the amount of system memory available to the information handling system for use in executing one or more applications and/or to reduce latency in accessing and storing information in one or more storage units.

Figure 1:
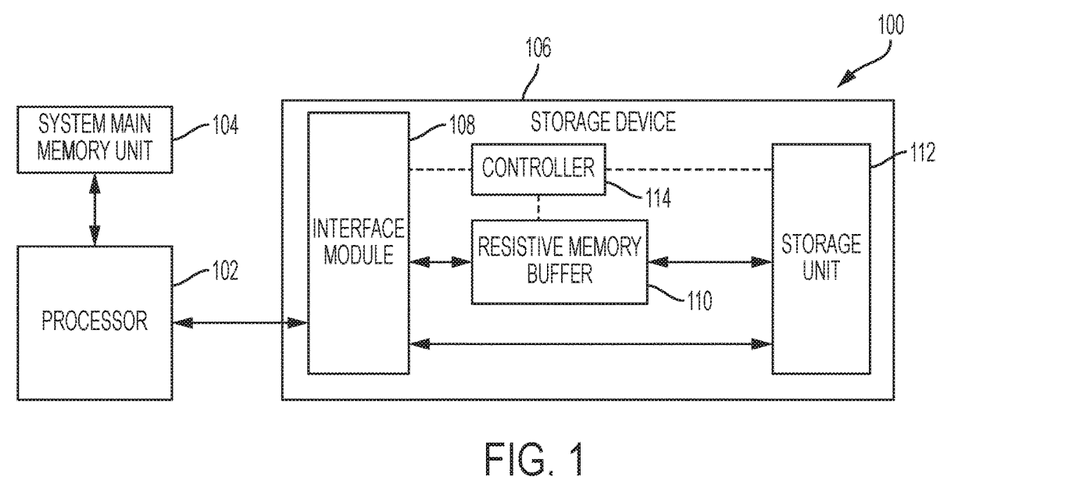
FIG. 1 is an example information handling system with a resistive memory buffer according to some embodiments of the disclosure.

An information handling system 100 may include a processor 102, to access, manipulate, and generate information, as illustrated in FIG. 1. The processor 102 may be coupled to a system main memory unit 104. The system main memory unit 104 may, for example, be a random access memory of the information handling system 100 and may include DRAM. DRAM is a form of volatile memory which may lose the information stored thereon if power supplied to the DRAM is cut off. The system main memory unit 104 may also include a graphics memory of the information handling system 100. The processor 102 may map the system main memory unit 104 as system memory to store information for rapid access by the processor 102. For example, the system main memory unit 104, when mapped as system memory, may store information currently being used by an application executed by the processor 102.

The information handling system 100 may include a storage device 106 for long-term storage of information. Storage device 106 may, for example, be a solid state drive. The storage device 106 may include an interface module 108 for communicating with the processor 102 and, by extension, the system main memory unit 104. For example, the storage device 106 may be connected to the processor 102 via a PCIe bus. The storage device 106 may include a storage unit 112, or multiple storage units, for long-term storage of information. The storage unit 112 may include non-volatile memory, such as a NAND flash array or other non-volatile solid state storage. The storage unit 112 may communicate with the processor 102 through the interface module 108, for example, to transfer information from the storage unit 112 to the system main memory unit 104 or to transfer information from the system main memory unit 104 to the storage unit 112. A controller 114, such as a SOC controller, may control operation of the interface module 114 and the storage unit 112. For example, the processor 102 and the controller 114 may communicate with each other to coordinate information transfer between the system main memory unit 104 and the storage unit 112.

The storage device 106 may also include a resistive memory buffer 110. The resistive memory buffer 110 may be coupled to the storage unit 112 and may include MRAM, such as spin-transfer torque MRAM, or NRAM. The resistive memory buffer 110 may be located in close proximity to the storage unit 112. The resistive memory buffer 110 may be coupled to the interface module 108 to facilitate communication between the resistive memory buffer 110 and the processor 102. The controller 114 may control the resistive memory buffer 110, in addition to the interface module 108 and the storage unit 112. For example, the controller 114 may manage traffic flow between the resistive memory buffer 110 and the storage unit 112. Alternatively or additionally, the processor 102 may control the resistive memory buffer 110.

The processor 102 may map the resistive memory buffer 110 as system memory, along with the system main memory unit 104. Thus, the resistive memory buffer 110 may also be used as system memory, along with the system main memory unit 104, by the processor 102, as described above.

Figure 2:
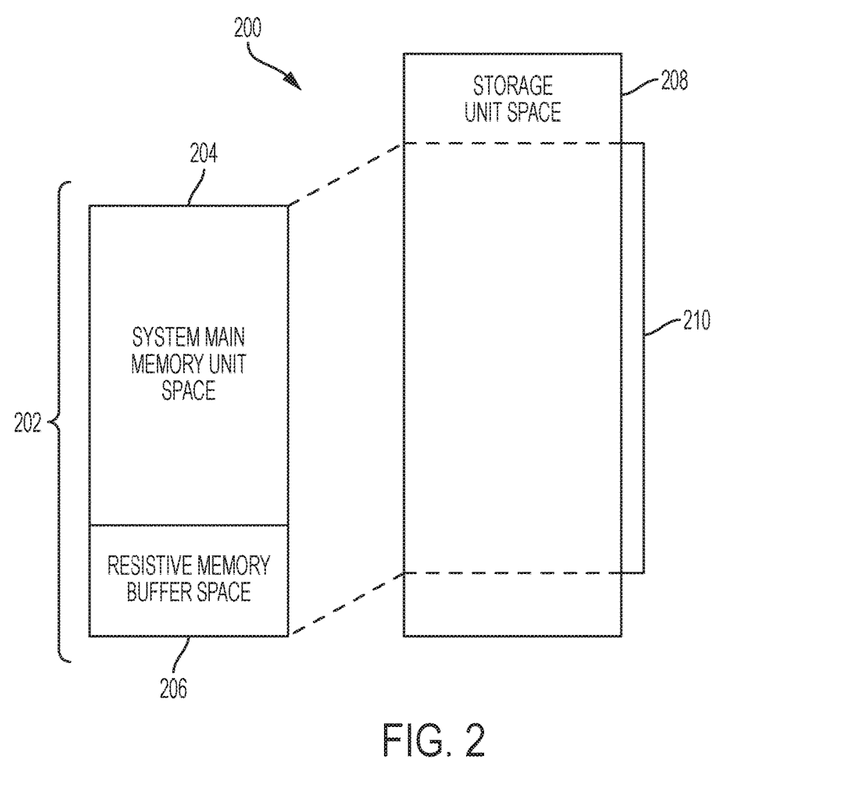
FIG. 2 is an illustration of a memory mapping of a system main memory unit, a resistive memory buffer, and a storage unit according to some embodiments of the disclosure.

The processor 102 may map the resistive memory buffer 110 as system memory in addition to the system main memory unit 104, so as to provide additional system memory space 202 for use by the processor 102, as shown in the memory mapping diagram 200 of FIG. 2. For example, the system main memory unit 104 may have an amount of system main memory unit space 204 for storing information, and the resistive memory buffer 110 may have an amount of resistive memory buffer space 206 for storing information. When the system main memory unit space 204 and the resistive memory buffer space 206 are mapped together as a combined system memory space 202, the combined system memory space 202 may provide more system memory space for use by the processor 102 than the system main memory unit space 204 alone. The system memory space 202 may be mapped to a segment 210 of the memory space 208 of the storage unit 112. Thus, information may be pulled, by the processor 102, from the segment 210 of the storage unit space 208 to the system memory space 202 for use by the processor 102. Additionally, when the processor 102 requires access to information contained in the storage unit space 208 that is not contained in the segment 210, the processor 102 may flush the information from the system memory space 202, copying the information to the segment 210, and redirect the system memory space 202 to another segment of the storage unit space 208. Thus, when mapped along with the system main memory unit space 204, as a combined system memory space 202, the resistive memory buffer space 206 may provide an increased amount of system memory space 202 for use by the processor 102, potentially reducing the frequency of flush operations and the latency of the information handling system 100 flushing the information stored in the resistive memory buffer 110 to the storage unit 112.

Figure 3:
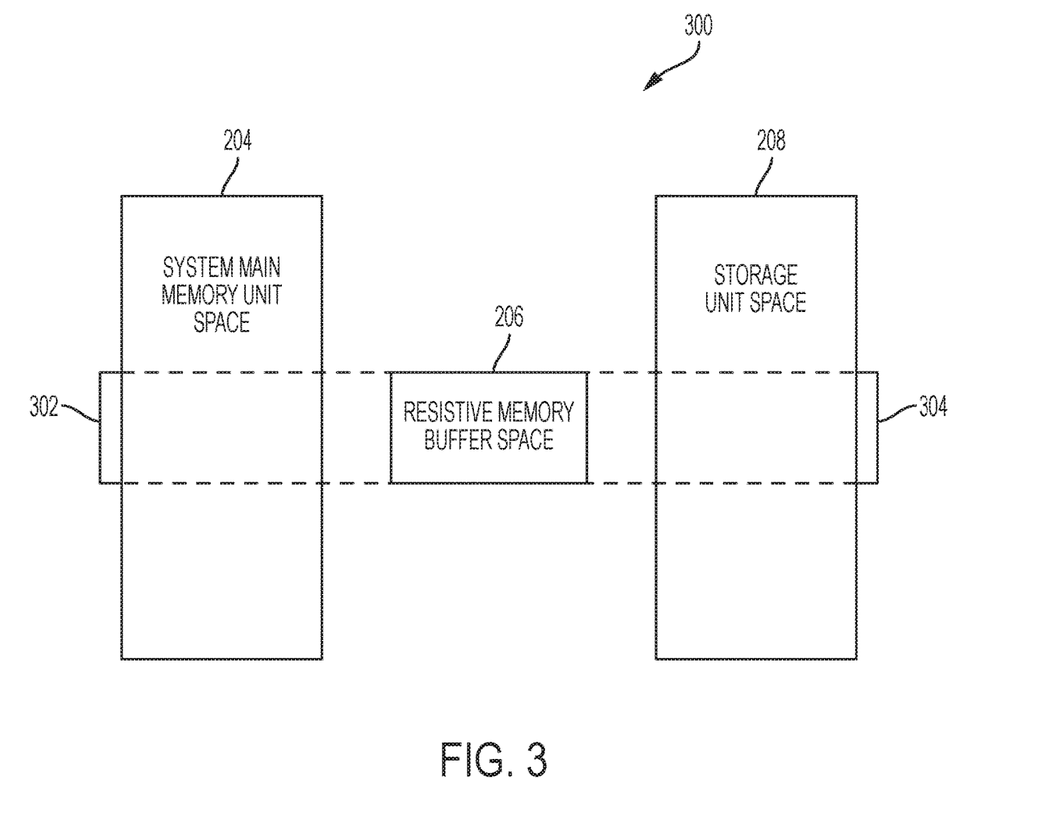
FIG. 3 is an illustration of a memory mapping of a system main memory unit, a resistive memory buffer, and a storage unit according to some embodiments of the disclosure.

The processor 102 may map the resistive memory buffer 110 to a segment of the system main memory unit 104, to mirror information stored in the segment of the system main memory unit 104, as shown in the memory mapping diagram 300 of FIG. 3. For example, the processor 102 may map the resistive memory buffer space 206 to a segment 302 of the system main memory unit space 204 to mirror information stored in the system main memory unit space 204. The processor 102 may also map the system main memory unit space 204 as system memory space. The processor 102 may map the resistive memory buffer space 206 to a segment 304 of the storage unit space 208, and the segment 302 of the system main memory unit space 204 may also be mapped to the segment 304 of the storage unit space 208 either directly or through resistive memory buffer space 206. The remaining system main memory unit space 204 outside the segment 302 may also be mapped to an additional segment of the storage unit space 208 Thus, when the processor 102 receives or generates instructions to access information stored in a segment of the storage unit space 208, it may map the resistive memory buffer space 206, and, optionally, the segment 302 of the system main memory unit space 204 to the segment 304 of the storage unit space 208. Thus information may be copied from the segment 304 to the resistive memory buffer space 206 and the segment 302. Alternatively, information may also be copied from the segment 304 to the resistive memory buffer space 206 and then from the resistive memory buffer space 206 to the segment 302. When the processor 102 determines to flush the information stored in the resistive memory buffer space 206 and the segment 302, the information stored in the resistive memory buffer space 206 may be copied to the segment 304 of the storage unit space 208 before being erased, while the information stored in the segment 302 of the system main memory unit space 204 may simply be erased without copying it to the segment 304. Because the resistive memory buffer 110 is located in the storage device 106, while the system main memory unit 104 is not, use of a resistive memory buffer 110 in the manner described above can reduce latency in flush operations of the information handling system 100, by an amount up to and exceeding two orders of magnitude, because it is not necessary to copy information stored in the segment 302 of the system main memory space 204 to the storage unit space 208.

Figure 4:
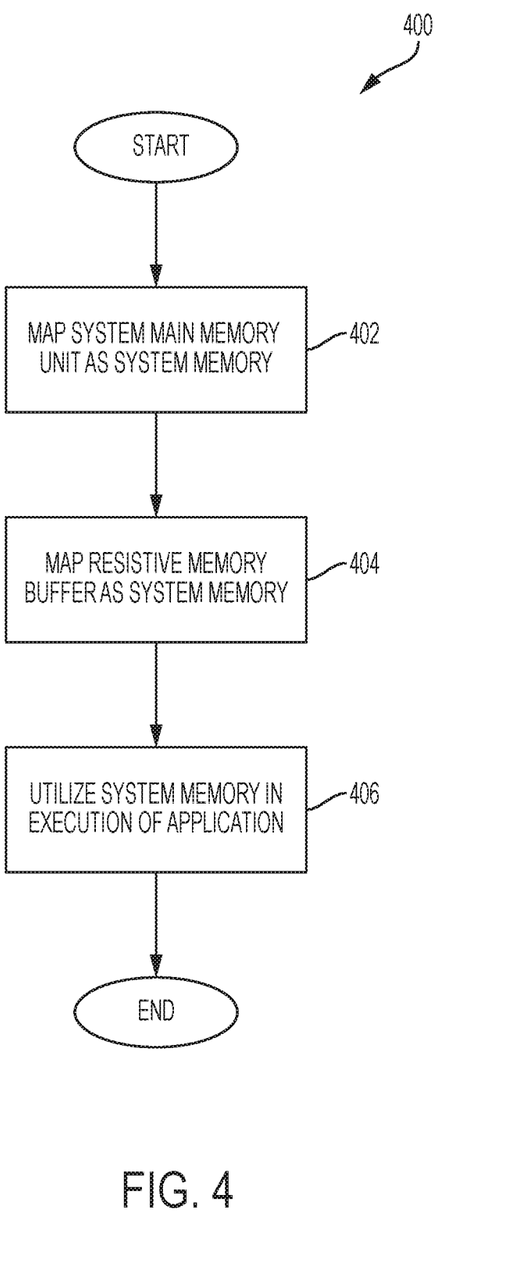
FIG. 4 is an example method of mapping a resistive memory buffer according to some embodiments of the disclosure.

A resistive memory buffer and system main memory unit may be mapped as system memory according to a method 400 of FIG. 4. A system main memory unit may be mapped, at step 402, as system memory. A resistive memory buffer may also be mapped, at step 404, as system memory. For example, the resistive memory buffer may be mapped as system memory using a two level system main memory mapping architecture (2LM). The resistive memory buffer may present itself to a processor as a 2LM memory element upon device initialization to be mapped as system memory. Using the 2LM architecture, a resistive memory buffer for use as system memory may be implemented without a need for any proprietary chipset mechanism. An information handling system, such as information handing system 100, may then utilize, at step 406, the mapped system memory in execution of one or more applications. The additional system memory mapped from the resistive memory buffer may reduce latency in execution of the one or more applications, thereby enhancing a user experience. For example, the operating system may have access to an increased amount of system memory as a result of the implementation of the resistive memory buffer.

Figure 5:
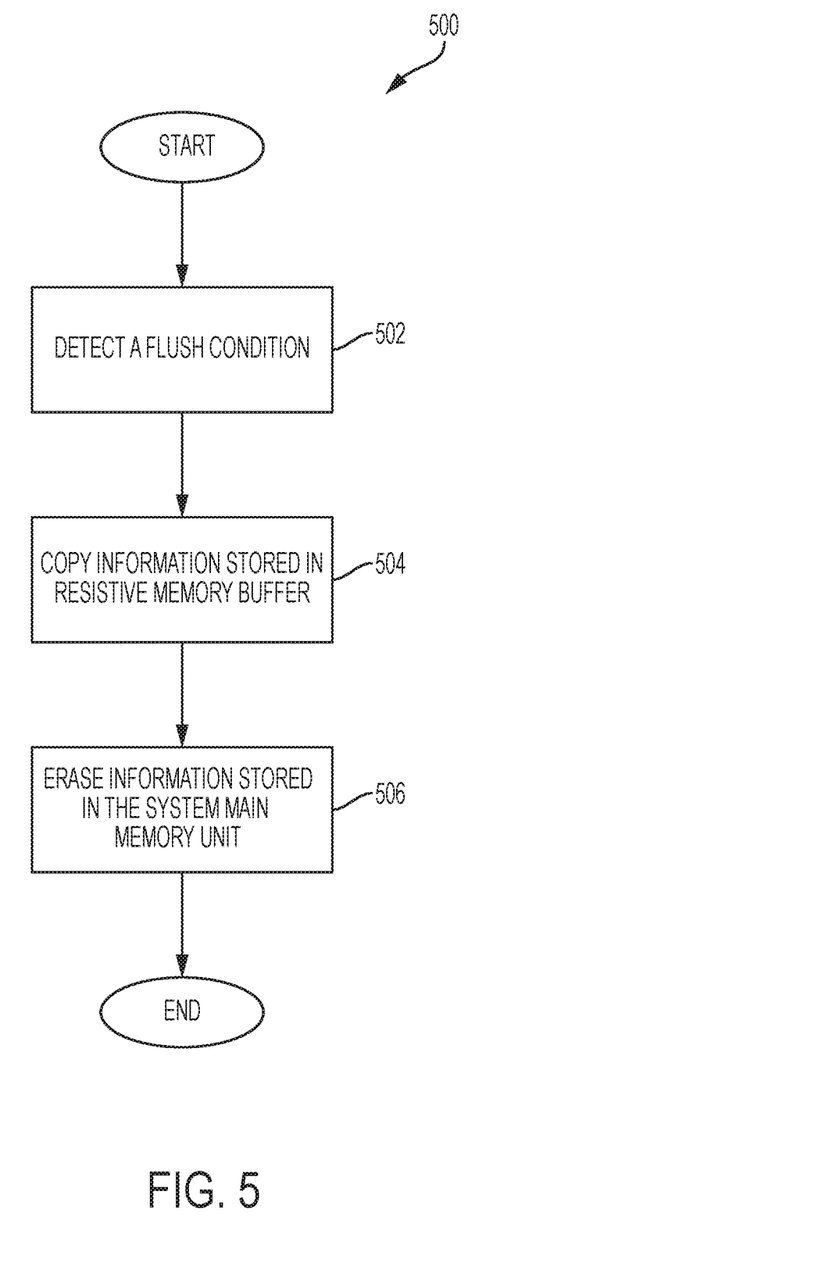
FIG. 5 is an example method of flushing a resistive memory buffer according to some embodiments of the disclosure.

A resistive memory buffer of a storage device mapped to a segment of a system main memory unit may also reduce latency when flushing the information stored in the resistive memory buffer to the storage device. An example method 500 for flushing a resistive memory buffer is shown in FIG. 5. The method 500 may commence with detection of a flush condition, at step 502. For example, a processor, such as processor 102, may require access to information not stored in system memory and may instruct the resistive memory buffer to flush its contents to a segment of a storage unit and load information stored in another segment of the storage unit for use by the processor. At step 504, information stored in the resistive memory buffer may be copied to a segment of a storage unit. After the information is copied, the information stored in the resistive memory buffer may be erased. Further, at step 506, information stored in the segment of the system main memory unit to which the resistive memory buffer is mapped may also be erased, without copying the information from the system main memory unit to the storage unit. Because the resistive memory buffer is located in the storage device with the storage unit, it may take less time to copy the information from the resistive memory buffer to the storage unit than it would take to copy information from the segment of the system main memory unit to the storage unit, thereby reducing system latency.

Figure 6:
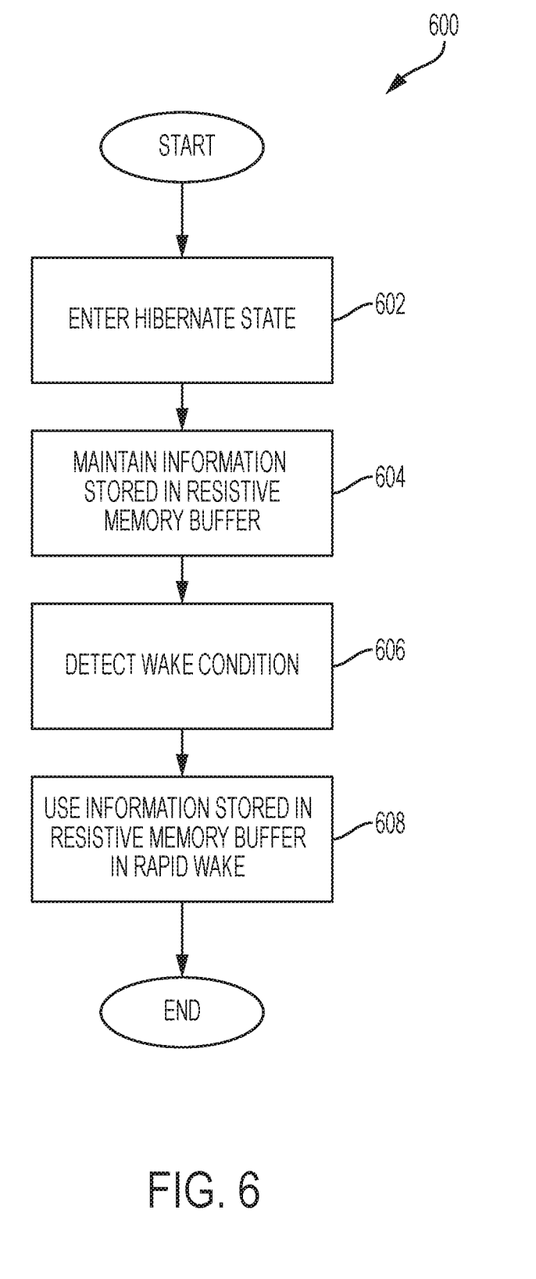
FIG. 6 is an example method of utilizing a resistive memory buffer when entering and exiting a hibernate state according to some embodiments of the disclosure.

Use of a resistive memory buffer may also reduce the amount of required to enter and exit a hibernate or powered down state. A method 600 of utilizing a resistive memory buffer in entering and exiting a hibernate state is shown in FIG. 6. The method 600 may begin with an information handling system entering a hibernate state, at step 602. Entering the hibernate state may include cutting off power to the resistive memory buffer and a system main memory unit. When the system enters a hibernate state, the system main memory unit may lose the information stored thereon as it may include volatile memory such as DRAM. In order to avoid losing information stored in the system main memory unit when entering the hibernate state or powering down, it may be necessary to flush the system main memory unit, copying the stored information to a storage unit. Flushing the system main memory unit prior to entering a hibernate state or shutting down may increase the time taken to power down or enter the hibernate state and may therefore negatively affect a user experience. It is not necessary to flush a resistive memory buffer prior to entering a hibernate state or shutting down as the resistive memory buffer may maintain the information stored thereon even when power is not supplied. While the information handling system is in the hibernate state, information stored in the resistive memory buffer may be maintained, at step 604. For example, the resistive memory buffer may include MRAM, NRAM, or another type of non-volatile memory and may maintain the information stored thereon even when insufficient power, or even no power, is supplied to the resistive memory buffer. A wake condition may then be detected, at step 606. For example, a user may input a command to the information handling system instructing it to exit the hibernate state. When the information handling system wakes, the information stored in the resistive memory buffer will be available to be used by a processor of the information handling system, without needing to copy the information from a storage unit to the resistive memory buffer. In some embodiments, the information stored in the resistive memory buffer may be used, at step 608, in a rapid wake from the hibernate state, reducing the amount of time it takes the information handling system to exit the state. Similarly, information stored in a resistive memory buffer may be maintained even when an information handling system is powered down and may be used to decrease the time it takes the information handling system to power up. Furthermore, if an information handling system, such as information handling system 100 experiences power loss, information stored in the resistive memory buffer will not be lost, as may happen with DRAM or other volatile memory. Thus a user experience may be enhanced through reduced sleep, wake, power down, and/or power up time of an information handling system through use of a resistive memory buffer.

Figure 7:
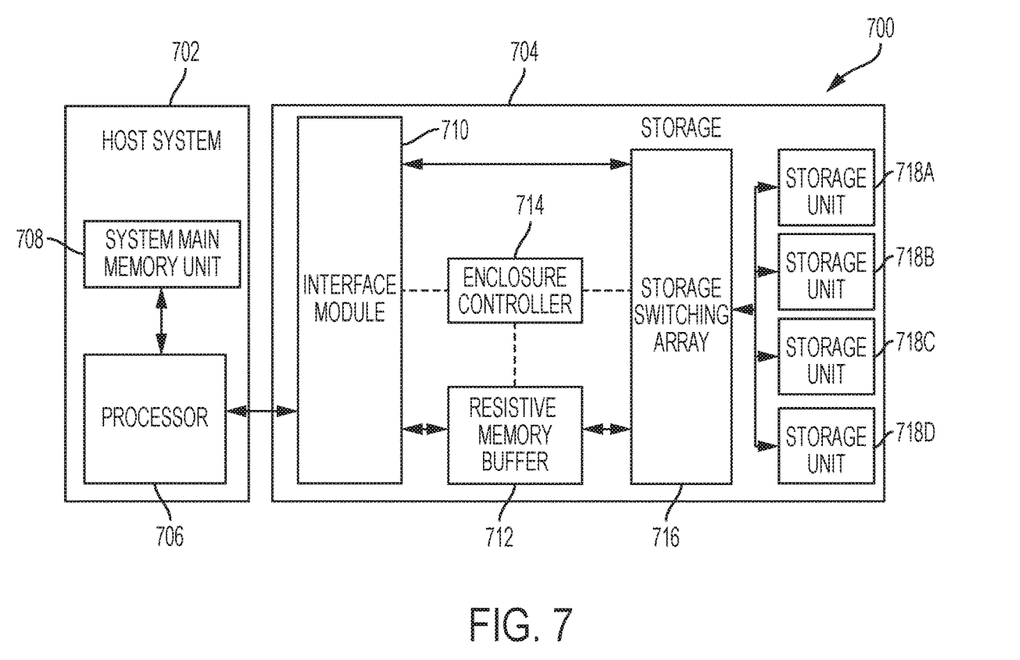
FIG. 7 is an example information handling system with a resistive memory buffer as part of a storage device array according to some embodiments of the disclosure.

A resistive memory buffer may be implemented in enterprise applications as well. For example, an information handling system 700 may include a host system 702 and a storage device 704. Storage device 704, may, for example, be an enterprise storage enclosure. The host system may include a processor 706 coupled to a system main memory unit 708. The storage device 704 may include a plurality of storage units 718A-D along with a resistive memory buffer 712. The storage device 704 may also include a storage switching array 716 coupled between the resistive memory buffer 712 and the plurality of storage units 718A-D to selectively couple the resistive memory buffer 712 to one or more of the storage units 718A-D. The storage device 704 may further include an interface module 710 to facilitation communication between the host system 702 and the components housed in the storage device 704, such as the storage units 718A-D and the resistive memory buffer 712. The storage switching array 716 may selectively couple one or more of the plurality of storage units 718A-D to the processor 706 via the interface module 710. An enclosure controller 714 may be included in the storage device 704 and may control operation of the interface module 710, the resistive memory buffer 712, the storage switching array 714, and the plurality of storage units 718A-D. The processor 706 may also control the interface module 710, the resistive memory buffer 712, the storage switching array 716 and the plurality of storage units 718A-B, in place of or in conjunction with the enclosure controller 714. The processor 706 of the host system 702 may communicate with the resistive memory buffer 712 exclusively through controller 714 or directly. The controller 714 may communicate with the storage switching array 714 and the plurality of storage units 718A-D exclusively through the resistive memory buffer 712 or directly.

The resistive memory buffer 712 may be mapped as system memory by the processor 706 and used by processor 706 in executing one or more applications in much the same way as the resistive memory buffer 110 of FIG. 1 may be mapped and used by processor 102, as described with respect to FIGS. 2-6. The resistive memory buffer 712 may provide many of the same advantages provided by resistive memory buffer 110, given its close proximity to storage units 718A-D in the storage device 704. For example, the processor 706 may map resistive memory buffer 712 as system memory along with system main memory unit 708. Such mapping may provide the processor 706 with a greater amount of system memory for use in executing one or more applications than with the system main memory unit 708 mapped as system memory alone.

The processor 706 may map the resistive memory buffer 712 to a segment of the system main memory unit 708 to store the same information stored in the segment. Then, when a flush condition occurs, the storage switching array 716 may couple the resistive memory buffer 712 to a storage unit of the plurality of storage units 718A-D to which it is mapped, the resistive memory buffer may copy its contents to the storage unit, and the information stored on the resistive memory buffer 712 and the system main memory unit 708 may be used. The storage switching array 716 may then couple the resistive memory buffer 712 to a storage unit containing information for use by the processor 706, and the information may be copied to the resistive memory buffer 712 and the system main memory unit 708. In some embodiments, the storage switching array 716 may couple the system main memory unit 708, via interface module 710, to the storage unit containing information to be used by the processor to copy the desired information directly from the storage unit to the system main memory unit 708. Alternatively, the storage switching array 716 may only couple the resistive memory buffer 712 to the storage unit containing information to be used by the processor 706. The information may be copied to the resistive memory buffer 712 and then copied from the resistive memory buffer 712 to the system main memory unit 708, via the interface module 710. Thus, a resistive memory buffer in a storage device may reduce latency, prevent data loss in the event of a power failure, and enhance system capabilities.

The schematic flow chart diagram of FIGS. 4-6 are generally set forth as logical flow chart diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. An information handling system, comprising:
   a processor;
   a system main memory unit; and
   a storage device, comprising:
      a buffer;
      a storage unit;
      a first interface module; and
      a controller configured to control read/write operations of the storage device, wherein the first interface module couples the processor to the controller, and wherein the controller is configured to:
         write data from the storage unit into the buffer to buffer data from the storage unit;
      wherein the processor is configured to map the buffer and the system main memory unit into the system memory address space, and
      wherein the processor is configured to communicate with the buffer and the storage unit through the first interface module.

2. The information handling system of claim 1, wherein the buffer comprises a non-volatile resistive memory buffer.

3. The information handling system of claim 2, wherein the resistive memory buffer comprises at least one of magneto-resistive random-access memory (MRAM) and nano random-access memory (NRAM).

4. The information handling system of claim 1, wherein the system main memory unit comprises dynamic random-access memory (DRAM).

5. The information handling system of claim 1, wherein the processor is configured to address the memory buffer and the system main memory unit as a linear memory space such that a total amount of the system memory accessible to the processor is larger than the system main memory unit alone.

6. The information handling system of claim 1, wherein the processor is configured to map the memory buffer to a segment of the system main memory unit, such that information stored in the memory buffer is redundant to information stored in the segment of the system main memory unit.

7. The information handling system of claim 6, wherein the processor is configured to perform steps comprising:
   detecting a flush condition for the segment of the system main memory unit;
   copying the information stored in the memory buffer to the storage unit; and
   erasing the segment of the system main memory unit without copying the information stored in the segment to the storage unit.

8. The information handling system of claim 1, wherein the processor is configured to communicate with the memory buffer through the first interface module and independent of the controller.

9. The information handling system of claim 2, wherein the processor is configured to perform steps comprising:
receiving, by the processor, an instruction to enter a hibernate state;
maintaining information stored in the memory buffer through the hibernate state;
detecting, by the processor, a wake condition; and
upon detection of the wake condition, using the information stored in the memory buffer to perform a rapid wake of the information handling system from the hibernate state.

10. A method, comprising:
mapping, by a processor, a system main memory unit into a system memory address space;
mapping, by the processor, a memory buffer of a storage device into the system memory address space;
utilizing, by the processor, both the system main memory unit and the memory buffer in the execution of one or more applications executed by the processor through the system memory address space,
wherein the storage device further comprises a storage unit, and
wherein utilizing the system main memory unit and the memory buffer comprises communicating, by the processor, with the memory buffer and the storage unit via an interface module of the storage device; and
controlling, by a controller coupled between the processor and a combination of the storage unit and the memory buffer, read/write operations of the storage device, the read/write operations comprising at least:
writing data from the storage unit into the memory buffer to buffer data from the storage unit.

11. The method of claim 10, wherein mapping the memory buffer into a system memory address space comprises mapping the memory buffer to a segment of the system main memory unit so that information stored in the memory buffer is the same as information stored in the segment of the system main memory unit.

12. The method of claim 11, further comprising:
detecting, by the processor, a flush condition for the segment of the system main memory unit;
copying the information stored in the memory buffer to the storage unit of the storage device; and
erasing the segment of the system main memory unit without copying the information stored in the segment to the storage unit of the storage device.

13. The method of claim 11, further comprising:
receiving, by the processor, an instruction to enter a hibernate state;
maintaining information stored in the memory buffer through the hibernate state;
detecting, by the processor, a wake condition; and
upon detection of the wake condition, using the information stored in the memory buffer to perform a rapid wake of the information handling system from the hibernate state.

14. An information handling system, comprising:
a host system, comprising:
a processor and
a system main memory unit; and
a storage device, comprising:
a plurality of storage units,
a memory buffer,
a first interface module, and
a controller configured to control read/write operations of the storage device, wherein the first interface module couples the processor to the controller, and wherein the controller is configured to:
write data from the storage unit into the buffer to buffer data from the storage unit;
wherein the processor is configured to map the memory buffer into a system memory address space of the host system, and
wherein the processor is configured to communicate with the memory buffer and the plurality of storage units through the first interface module.

15. The information handling system of claim 14, wherein the memory buffer comprises a resistive memory buffer comprising at least one of magneto-resistive random-access memory (MRAM) and nano random-access memory (NRAM).

16. The information handling system of claim 14, wherein the storage device further includes a storage switching array coupled between the memory buffer and the plurality of storage units, wherein the storage switching array is configured to selectively couple the memory buffer to one or more of the plurality of storage units.

17. The information handing system of claim 14, wherein the plurality of storage units comprises a plurality of solid state drives.

18. The information handling system of claim 14, wherein the processor is configured to address the memory buffer and the system main memory unit as a linear memory space such that a total amount of the system memory accessible to the processor is larger than the system memory alone.

19. The information handling system of claim 14, wherein the processor is further configured to map the memory buffer to a segment of the system main memory unit, so that information stored in the memory buffer is the same as information stored in the segment of the system main memory unit.

* * * * *